United States Patent
Milbredt et al.

(10) Patent No.: US 8,904,075 B2
(45) Date of Patent: Dec. 2, 2014

(54) MOTOR VEHICLE HAVING A FLEXRAY BUS

(75) Inventors: Paul Milbredt, Ingolstadt (DE); Christian Brunner, Nuremburg (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 14/001,572

(22) PCT Filed: Nov. 17, 2011

(86) PCT No.: PCT/EP2011/005797
§ 371 (c)(1),
(2), (4) Date: Aug. 26, 2013

(87) PCT Pub. No.: WO2012/113420
PCT Pub. Date: Aug. 30, 2012

(65) Prior Publication Data
US 2013/0332637 A1    Dec. 12, 2013

(30) Foreign Application Priority Data
Feb. 26, 2011 (DE) .......... 10 2011 012 572

(51) Int. Cl.
G06F 13/00 (2006.01)
H04L 12/417 (2006.01)
H04L 12/863 (2013.01)
G06F 13/40 (2006.01)
H04L 12/407 (2006.01)
H04L 12/40 (2006.01)

(52) U.S. Cl.
CPC .......... G06F 13/4068 (2013.01); H04L 12/417 (2013.01); H04L 47/6235 (2013.01); H04L 2012/40241 (2013.01); H04L 12/407 (2013.01); G06F 2213/0038 (2013.01); H04L 47/628 (2013.01)
USPC .......................... 710/110; 710/105; 710/117

(58) Field of Classification Search
USPC .......................... 710/110, 105, 117; 370/392
See application file for complete search history.

(56) References Cited

U.S. PATENT DOCUMENTS 7,586,953 B2 * 9/2009 Forest et al. .................. 370/503
8,484,383 B2 * 7/2013 Hartwich et al. ............. 709/250

(Continued)

FOREIGN PATENT DOCUMENTS

| DE | 102005059616 | 6/2007 |
|----|--------------|--------|
| DE | 102007003122 | 6/2008 |
| DE | 102007013511 | 9/2008 |
| DE | 102011012572.8 | 2/2011 |

(Continued)

OTHER PUBLICATIONS

Minkoo Kang et al. "A static message scheduling algorithm for reducing FlexRay network utilization", IEEE International symposium on industrial Electronics(ISIE 2009), Jul. 5-8, 2009, pp. 1287-1291.*

(Continued)

Primary Examiner — Faisal M Zaman
Assistant Examiner — Kim Huynh
(74) Attorney, Agent, or Firm — Staas & Halsey LLP

(57) ABSTRACT

A motor vehicle has a FlexRay bus. Values for operating parameters are stipulated for the FlexRay bus. The value for at least one selected operating parameter is obtained from an optimization method in which, on the basis of prescribed messages to be transmitted via the FlexRay, a plurality of values for the at least one selected operating parameter have an allocation—associated with these values—of slots to the prescribed messages provided for them according to a predetermined rule, and a predetermined sequence of the allocation is rated according to a predetermined criterion.

16 Claims, 1 Drawing Sheet

(56) References Cited

U.S. PATENT DOCUMENTS

2007/0081548 A1     4/2007    Jiang
2009/0094344 A1     4/2009    Fuehrer et al.
2009/0125592 A1*   5/2009    Hartwich et al. ............ 709/206

FOREIGN PATENT DOCUMENTS

WO    PCT/EP2011/005797        11/2011

OTHER PUBLICATIONS

Ece Guran Schmidt et al., "Message Scheduling for the FlexRay Protocol: The Dynamic Segment," IEEE Transactions on Vehicular Technology, vol. 58, No. 5, Jun. 2009, pp. 2160-2169.

Minkoo Kang et al., "A Static Message Scheduling Algorithm for Reducing FlexRay Network Utilization," IEEE International Symposium on Industrial Electronics (ISIE 2009), Jul. 5-8, 2009, pp. 1287-1291.

Traian Pop et al., "Bus Access Optimisation for FlexRay-based Distributed Embedded Systems," Proceedings of the conference on Design, automation and test in Europe, 2007, 6 pages.

English language International Search Report for PCT/EP2011/005797, 2 pages.

English Language Translation of International Preliminary Report on Patentability, Downloaded from WIPO Website on Aug. 26, 2013, 5 pages.

* cited by examiner

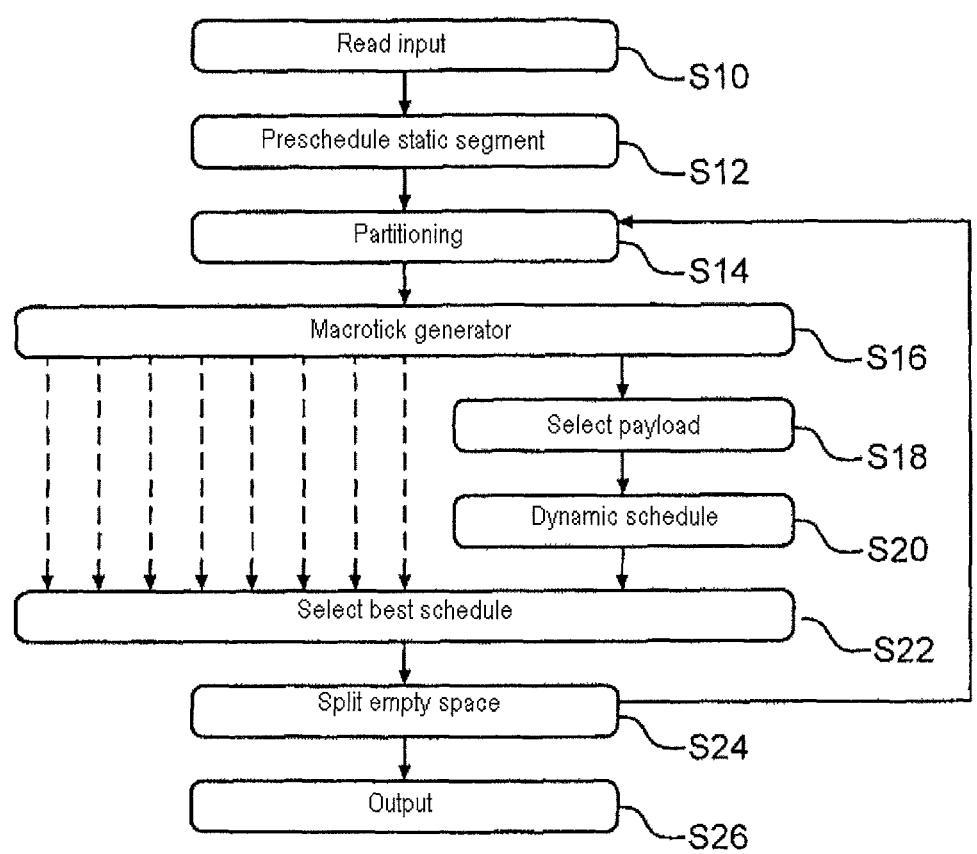

MOTOR VEHICLE HAVING A FLEXRAY BUS

CROSS REFERENCE TO RELATED APPLICATIONS

This application is based on and hereby claims priority to International Application No. PCT/EP2011/005797 filed on Nov. 17, 2011 and German Application No. 10 2011 012 572.8 filed on Feb. 26, 2011, the contents of which are hereby incorporated by reference.

BACKGROUND

The invention relates to a motor vehicle having a FlexRay bus and to a method for optimizing the value for at least one selected operating parameter of a FlexRay bus.

A FlexRay bus can and must have a multiplicity of operating parameters stipulated prior to said bus being started up. Furthermore, what is known as the scheduling must typically be stipulated, i.e. particular messages, which are fundamentally meant to be sent repeatedly, need to be provided for the stipulation regarding when they are sent in what form. The scheduling involves what is known as the allocation of slots to the messages. A slot is a time interval having a fixed position in time in a cycle. The allocation of the slots involves stipulating both the temporal length of the slots and the number thereof.

To date, the values for the operating parameters are stipulated totally independently of the scheduling. The parametrization is performed according to predetermined methods in which, on the basis of a particular approach, an attempt is made to guess the best parameter values. There are also separate techniques for the problem of allocating slots.

A drawback in the related art is that the opportunities provided by a FlexRay bus are not utilized in optimum fashion. The FlexRay bus systems are therefore also difficult to extend. There is a static segment having a fixed slot length and a dynamic segment having a variable slot length. The dynamic segment of the FlexRay is designed merely on the basis of a use profile in the related art, and there is no functional planning, but rather the planning is controller based.

A technical article by E. G. SCHMIDT and K. SCHMIDT ("Message Scheduling for the FlexRay Protocol: The Dynamic Segment", IEEE TRANSACTIONS ON VEHICULAR TECHNOLOGY, IEEE SERVICE CENTER, PISCATAWAY, N.J., USA, Vol. 58, No. 5, Jun. 1, 2009 (2009 Jun. 1), pages 2160-2169) describes a method for optimizing flow coordination (scheduling) for a dynamic segment for message frames of the FlexRay protocol. The method presupposes that all periodically sent messages are transmitted in static segments and the optimization is performed only for messages that are to be sent sporadically. The optimization is performed to minimize the overall length of the dynamic segment. In this case, the assurance is also provided that all messages were transmitted within their prescribed maximum transmission period. As part of the optimization, a suitable order for the transmitted messages within the dynamic segment is ascertained.

A technical article by KANG ET AL. ("A static message scheduling algorithm for reducing FlexRay network utilization", INDUSTRIAL ELECTRONICS, 2009, ISIE 2009, IEEE INTERNATIONAL SYMPOSIUM ON, IEEE, PISCATAWAY, N.J., USA, NJ, USA, Jul. 5, 2009 (2009 Jul. 5), pages 1287-1291) describes a method for optimizing flow coordination for messages that are sent periodically on a FlexRay bus. According to the method, a split for periodically sent messages between the static segment and the dynamic segment is optimized. The optimization also comprises a combination of a plurality of messages within a FlexRay message frame.

SUMMARY

It is one potential object to increase the performance and extendability of a FlexRay bus in a motor vehicle.

According to the inventors' proposal, the value for at least one selected operating parameter is therefore obtained from an optimization method. The proposal actually specifies such an optimization method for the first time: in the optimization method, on the basis of prescribed messages to be transmitted via the FlexRay bus, a plurality of values for the at least one selected operating parameter have an allocation—respectively associated with these values—of slots to the prescribed messages provided for them according to a predetermined rule, and a predetermined sequence of the allocation is rated according to a predetermined criterion. Thus, particular values for the operating parameters are each assigned allocations, so that the values for the operating parameters are stipulated and the allocation is stipulated simultaneously.

One of the selected operating parameters is the macrotick length. The macrotick is the smallest synchronized unit of time. The proposal is based on the insight that the macrotick length is a very significant parameter that determines the performance of the FlexRay bus.

The proposed method and device use a holistic approach that allows a global optimum to be attained; the parameterization is optimized at the same time as the scheduling or is ideally attuned to the scheduling. One is considered on the basis of the other. The proposed method and device, with the optimally selected operating parameters and the associated optimum scheduling, that is to say the optimum allocation of slots to the prescribed messages, makes it possible to provide a lower bus load for the same data volume, the FlexRay bus can be used more flexibly and the overall perception is more function oriented than oriented to the controller.

In one preferred embodiment, a further selected operating parameter is the payload magnitude, that is to say particularly the length of a payload in a dynamic segment. The payload is the content of the data, that is to say that portion of the data in a slot that follows the header and precedes the trailer. The payload magnitude indicates the volume of data that is transmitted to a slot.

The payload magnitude joins in as a significant parameter. If both of said operating parameters are simultaneously varied as part of an optimization method, the remaining parameters can be selected rather (that is to say more or less) arbitrarily, particularly according to one of the known methods.

In this preferred embodiment, the predetermined criterion is preferably that the total duration of the transmission of the prescribed messages is at a minimum. In this case, the total duration is the predetermined sequence that is rated according to a predetermined criterion, namely in respect of the minimal status.

In this aspect, the proposed method and device are based on the insight that the macrotick length together with the payload magnitude determines the total duration of the transmission of the prescribed messages, and that this total duration for its part determines, by nature immediately, how quickly the FlexRay bus can react and therefore how powerful it is.

In one preferred aspect, the predetermined rule according to which the allocation of slots to the prescribed messages is provided is that, on the basis of an allocation of slots that has already been performed in a static segment of a transmission cycle in the FlexRay bus, slots are allocated in a dynamic segment of the transmission cycle. The distinction between static and dynamic segments is an inherently known distinction, for example cf. DE 10 2005 059 616 A1.

The optimization is therefore performed for the dynamic segment, which in this aspect is therefore stipulated according to a particular determinism, that is to say is given rather more the character of a further static segment.

In this aspect, the predetermined rule is preferably that is that such dynamic slots as ensure the transmission of all prescribed messages in a transmission cycle are allocated.

This condition actually provides the prescribing of particular messages with a purpose in the first place, namely that of the messages actually being transmitted in a particular transmission cycle. Suitable customerization of the parameters (particularly macrotick length and payload magnitude) and the suitable allocation of slots both in the static segment and in the dynamic segment mean that, under the usual circumstances, it is possible to satisfy the condition or conversely to select the parameters in optimum fashion on the basis of the condition having been satisfied.

The proposed method for optimizing the value for at least one separated operating parameter of a FlexRay bus involves the use of the user input relating to messages to be transmitted in the FlexRay bus (always in a respective cycle) to perform an automatic calculation method in which a plurality of values for the selected operating parameter whose value is intended to be optimized have an allocation of slots to the messages to be transmitted ascertained for them according to a predetermined rule, and a predetermined sequence is rated according to a predetermined criterion and the rating is taken as a basis for selecting the value and the allocation, a selected operating parameter being a macrotick length.

The method makes it possible to provide a motor vehicle with the automatic calculation method taking account of the complexity of the situation.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The FIGURE is a flowchart to explain an embodiment of the proposed method as performed from the perspective of the data processing device that implements the method.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

A data processing device, for example a personal computer on which a suitable program that implements the method of this application is stored in order to optimize the operating parameters for a FlexRay bus and simultaneously to perform scheduling, first of all receives a user input in step S10. The user input is used to communicate which messages need to be sent in each transmission cycle of the FlexRay bus. First of all, the static segment is prescheduled in S12, that is to say that slots are allocated to the messages that are read in, these slots having a predetermined, fixed length and having a particular structure. The prescheduling involves the stipulation of the slots, and the partitioning in step S14 involves the allocation of signals to the individual slots.

Subsequently, a large number of combinations of values of the macrotick length and the magnitude of the payload in the dynamic segment are run through. In the step S16, a macrotick generator stipulates a multiplicity of values for the macrotick. For each value, a multiplicity of values for the payload length are then selected in step S18. In this case, it is not necessary to run through all of the possible values, but rather it can be limited to "meaningful" values, that is to say to values that match the partitioning and the selected macrotick. For each combination of values for macrotick length and payload magnitude, the dynamic segment is then scheduled in step S20, that is to say that mini slots are allocated to the messages prescribed in step S10 after already allocated static slots have been filled, with the remaining messages in optimum fashion. These mini slots have a variable length that is expressed in the payload. In step S22, a predetermined criterion is thus then used to select the best schedule, namely particularly that schedule for which the total duration of the transmission of the prescribed messages is at a minimum. In step S24, the space not filled by databits in a schedule can subsequently be split. If a predetermined criterion is used here to establish that the allocation is not yet optimum, the step of partitioning in step S14 can be repeated, that is to say that the static segment can be altered, and then the dynamic segment can be defined once again in line with the modified static segment. Finally, the ascertained data, namely the two operating parameters macrotick length and payload magnitude, and also the schedule are output in step S26.

The method optimizes two operating parameters, namely precisely the macrotick length and the payload magnitude, at the same time as the schedule, i.e. the operating parameters and the schedule are attuned to one another.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:
1. A motor vehicle comprising:
a FlexRay bus operating according to operating parameters including a macrotick length, each operating parameter having a value stipulated for the FlexRay bus, wherein
the value for the macrotick length is obtained from an optimization in which, based on prescribed messages to be transmitted via the FlexRay bus, a plurality of possible macrotick length values are evaluated,
for each possible macrotick length value, slots are allocated to the prescribed messages according to a predetermined rule to produce a potential sequence of allocated slots, and
each potential sequence of allocated slots is rated according to a predetermined criterion to optimize the macrotick length.
2. The motor vehicle as claimed in claim 1, wherein
the operating parameter also include a payload magnitude,
the value for the payload magnitude is also obtained from the optimization, such that a plurality of possible macrotick length-payload magnitude value combinations are evaluated,
for each possible value combination, slots are allocated to the prescribed messages according to the predetermined rule to produce a potential sequence of allocated slots, and each potential sequence of allocated slots is rated according to the predetermined criterion to optimize the macrotick length and the payload magnitude.

3. The motor vehicle as claimed in claim 2, wherein the payload magnitude is a length of a payload in a dynamic segment.

4. The motor vehicle as claimed in claim 3, wherein the predetermined criterion is lowest total duration to transmit the prescribed messages.

5. The motor vehicle as claimed in claim 1, wherein
the FlexRay bus transmits messages in a transmission cycle,
the transmission cycle has a static segment and a dynamic segment, and
the predetermined rule specifies that, after allocating slots for the static segment of the transmission cycle, slots are allocated for the dynamic segment of the transmission cycle.

6. The motor vehicle as claimed in claim 5, wherein the predetermined rule specifies that sufficient dynamic slots are allocated to ensure transmission of all prescribed messages in the transmission cycle.

7. The motor vehicle as claimed in claim 1, wherein a data processing device performs the optimization to obtain the value for the macrotick length.

8. The motor vehicle as claimed in claim 1, further comprising a macrotick generator to generate the plurality of possible macrotick length values.

9. The motor vehicle as claimed in claim 8, wherein the FlexRay bus determines an optimal payload magnitude for a dynamic segment by evaluating a plurality of possible payload magnitudes for the dynamic segment in combination with evaluating each of the possible macrotick length values from among the plurality of possible macrotick length values.

10. A method for optimizing a value for a macrotick length operating parameter of a FlexRay bus, comprising:
receiving a user input relating to messages that are always to be transmitted in the FlexRay bus;
performing an automatic calculation to evaluate a plurality of possible macrotick length values for the macrotick length operating parameter, each possible macrotick length value being evaluated by allocating slots to the messages that are always to be transmitted according to a predetermined rule, to produce a potential sequence of allocated slots; and
each potential sequence of allocated slots is rated according to a predetermined criterion; and
using the rating as a basis for optimizing the macrotick length operating parameter and the potential sequence of allocated slots.

11. The method as claimed in claim 10, wherein
the method also optimizes a value for a payload magnitude operating parameter,
a plurality of possible macrotick length-payload magnitude value combinations are evaluated,
for each possible value combination, slots are allocated to the prescribed messages according to the predetermined rule to produce a potential sequence of allocated slots, and
each potential sequence of allocated slots is rated according to the predetermined criterion to optimize the macrotick length and the payload magnitude.

12. The method as claimed in claim 11, wherein the payload magnitude is a length of a payload in a dynamic segment.

13. The method as claimed in claim 11, wherein the predetermined criterion is lowest total duration to transmit the prescribed messages.

14. The method as claimed in claim 10, wherein
the FlexRay bus transmits messages in a transmission cycle,
the transmission cycle has a static segment and a dynamic segment, and
the predetermined rule specifies that, after allocating slots for the static segment of the transmission cycle, slots are allocated for the dynamic segment of the transmission cycle.

15. The method as claimed in claim 14, wherein the predetermined rule specifies that sufficient dynamic slots are allocated to ensure transmission of all prescribed messages in the transmission cycle.

16. A motor vehicle comprising:
a FlexRay bus operating according to operating parameters including a macrotick length, each operating parameter having a value stipulated for the FlexRay bus, wherein
the value for the macrotick length is obtained from an optimization in which, based on prescribed messages to be transmitted via the FlexRay bus, a plurality of possible macrotick length values are evaluated,
for each possible macrotick length value, slots are allocated to the prescribed messages according to a predetermined rule to produce a potential sequence of allocated slots, and
each potential sequence of allocated slots is rated according to a predetermined criterion to optimize the macrotick length,
wherein the plurality of possible macrotick length values include a first macrotick length value and a second macrotick length value,
wherein the FlexRay bus allocates slots to the prescribed messages using the first macrotick length value, produces a first potential sequence of allocated slots, and rates the first potential sequence of allocated slots, to evaluate the first macrotick length value,
the FlexRay bus allocates slots to the prescribed messages using the second macrotick length value, produces a second potential sequence of allocated slots, and rates the second potential sequence of allocated slots, to evaluate the second macrotick length value, and
the FlexRay bus selects one of the possible macrotick length values from among the plurality of possible macrotick length values, as an optimal value for the macrotick length, based on the rated potential sequence of allocated slots.

\* \* \* \* \*